June 11, 1963    C. H. BLAKEWOOD ETAL    3,093,735
ENERGY STORAGE DEVICE
Filed Jan. 22, 1960                           4 Sheets-Sheet 1
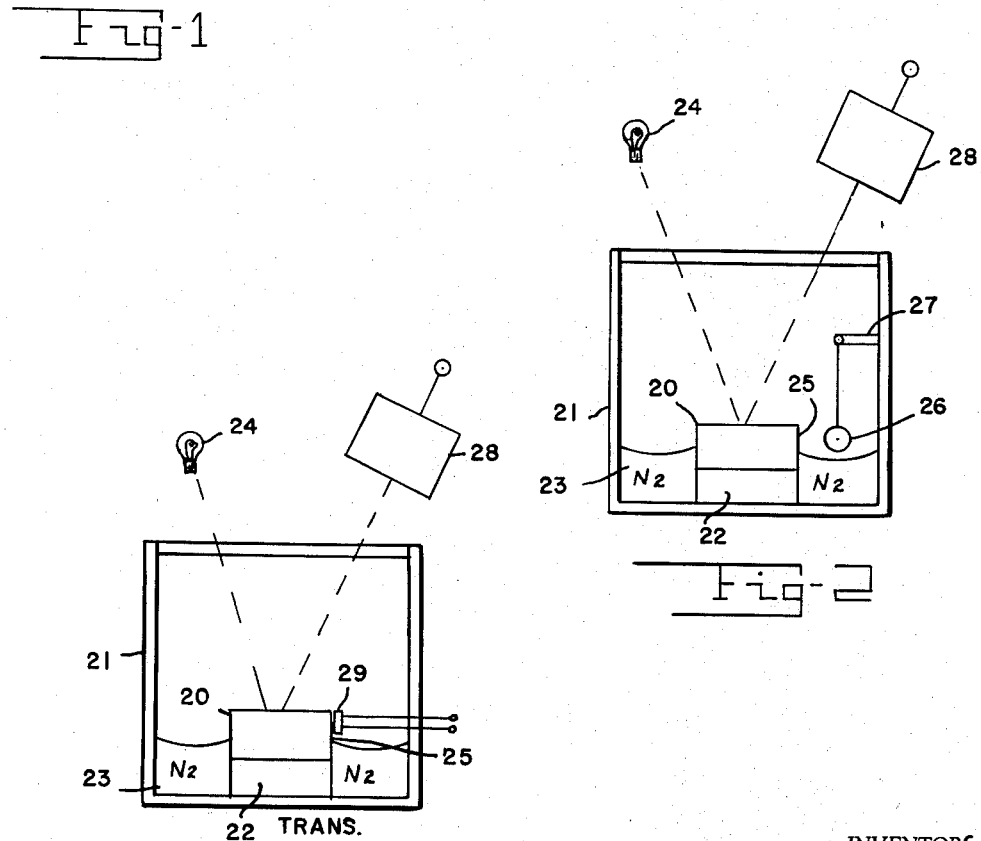
INVENTORS
CHARLES H. BLAKEWOOD
DOUGLAS M. WARSCHAUER
BY DONALD C. REYNOLDS
ATTORNEY
AGENT June 11, 1963
C. H. BLAKEWOOD ETAL
3,093,735
ENERGY STORAGE DEVICE
Filed Jan. 22, 1960
4 Sheets-Sheet 2
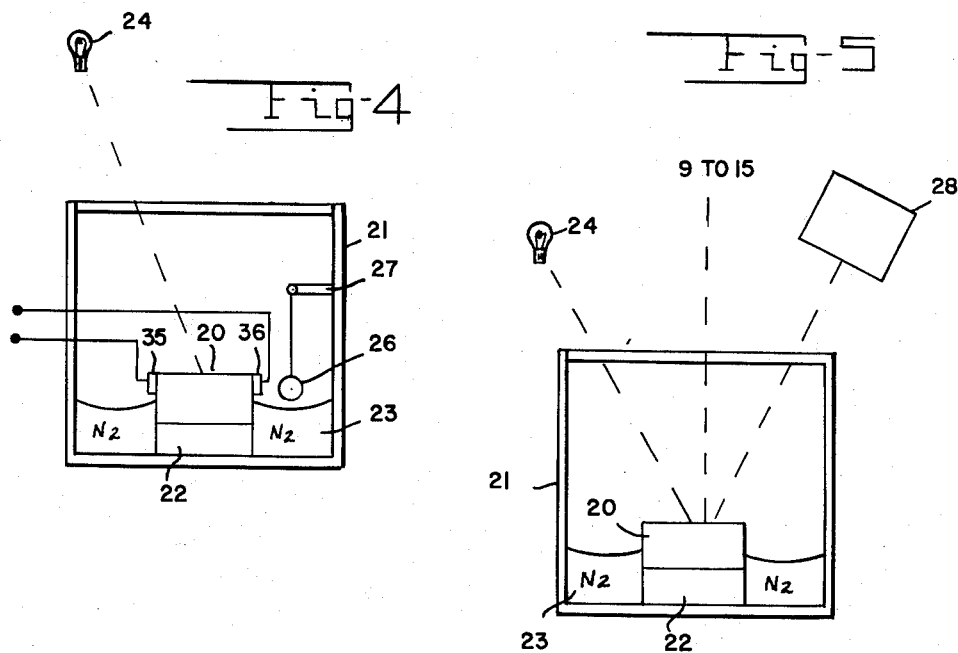
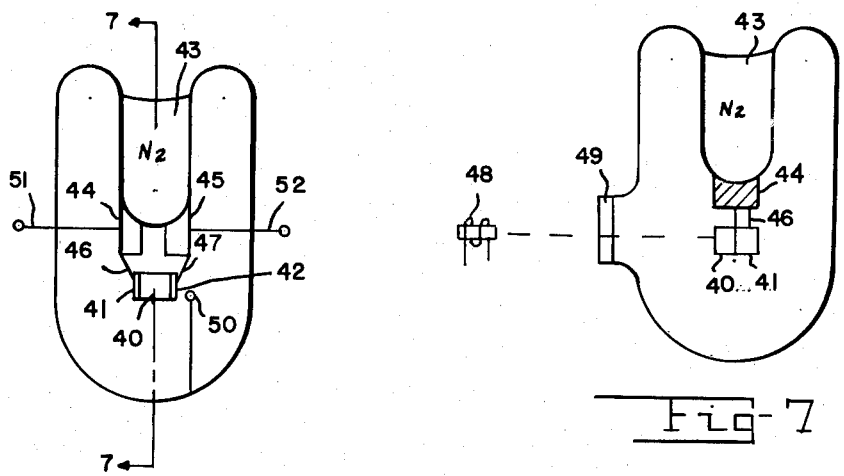
INVENTORS
CHARLES H. BLAKEWOOD
DOUGLAS M. WARSCHAUER
DONALD C. REYNOLDS
BY
ATTORNEY
AGENT June 11, 1963   C. H. BLAKEWOOD ETAL   3,093,735
ENERGY STORAGE DEVICE
Filed Jan. 22, 1960   4 Sheets-Sheet 3
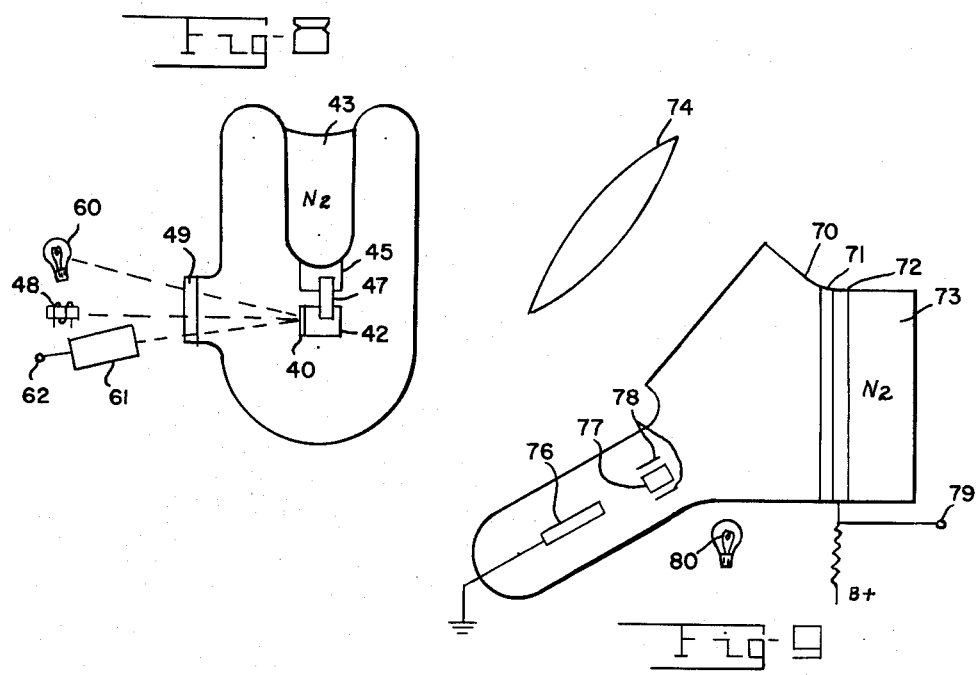
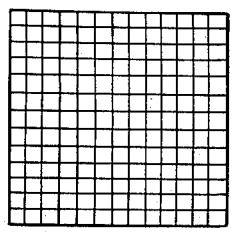
INVENTORS
CHARLES H. BLAKEWOOD
DOUGLAS M. WARSCHAUER
BY DONALD C. REYNOLDS
ATTORNEY
AGENT

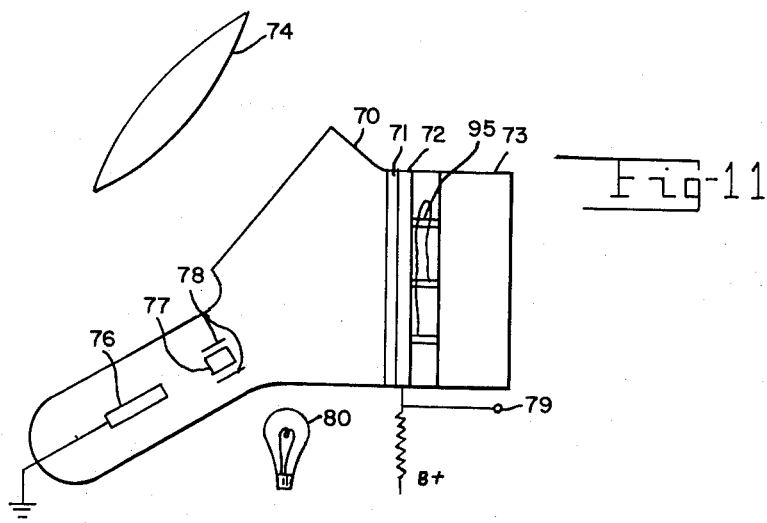
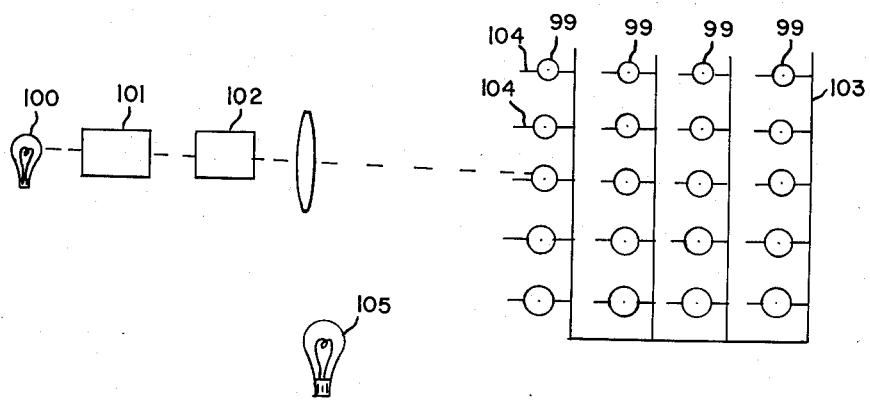
INVENTORS
CHARLES H. BLAKEWOOD
DOUGLAS M. WARSCHAUER
DONALD C. REYNOLDS

United States Patent Office 3,093,735
Patented June 11, 1963

3,093,735
ENERGY STORAGE DEVICE
Charles H. Blakewood, Baton Rouge, La., Donald C. Reynolds, Springfield, Ohio, and Douglas M. Warschauer, Newton Center, Mass., assignors to the United States of America as represented by the Secretary of the Air Force
Filed Jan. 22, 1960, Ser. No. 4,581
7 Claims. (Cl. 250—83)
(Granted under Title 35, U.S. Code (1952), sec. 266)

The invention described herein may be manufactured and used by or for the United States Government for governmental purposes without payment to us of any royalty thereon.

This invention relates to an energy storage device capable of storing energy for long periods of time.

One object is to provide an energy storage device wherein energy can be stored by irradiating the device with light up to 6900 angstroms.

Another object is to provide an energy storage device wherein the energy may be stored by thermal means.

Another object is to provide a device wherein an indication of the stored energy may be produced by mechanical means.

A further object is to provide a device wherein an indication of the stored energy may be produced by infrared irradiation.

A still further object is to provide a device wherein the indication is in the form of a change in conductivity.

These and other objects will be more fully understood from the following detailed description taken with the drawing wherein:

FIG. 1 shows an energy diagram for a material such as used in the device of the invention;

FIG. 2 shows a device using a storage cell which uses light energy to stimulate the cell and mechanical tapping to release the energy;

FIG. 3 shows a device similar to the device of FIG. 2 which uses an electro-mechanical transducer to provide the tapping;

FIG. 4 shows a device similar to FIG. 2 which senses the release of energy by the change in conductivity;

FIG. 5 shows a device similar to FIG. 2 in which infrared illumination is used to release the energy;

FIG. 6 shows a device using a storage cell which uses thermal energy to stimulate the cell and mechanical tapping to release the energy;

FIG. 7 is a view along the line 7—7 of FIG. 6;

FIG. 8 shows a device similar to FIG. 6 which senses the release of energy in the form of light in the range between green and red in the visible spectrum;

FIG. 9 shows a storage tube using the storage device of the invention;

FIG. 10 is a schematic showing of the storage screen of FIG. 9;

FIG. 11 shows the device of FIG. 9 modified to use thermal energy to stimulate the storage cells;

FIG. 12 shows one possible storage unit which uses a flying spot scanner to illuminate the storage units.

Referring more particularly to FIG. 1 of the drawing wherein reference number 11 refers to the conduction band in the energy diagram and 12 refers to the valence band. Between these two bands, four bands are shown, to, and, from which various transitions are possible. Directly below the conduction band is the electron trapping level 13. Green light is emitted if an electron from this level makes a transition to the valence band. The wave length of this green light is approximately 5200 angstroms. This level is in equilibrium with the conduction band, which means that electrons in the conduction band may be trapped in this level and, if holes are present in the valence band, these electrons can make transitions to the valence band, thereby emitting green light.

The next level 14 is the silver level which may or may not be present in the crystal. Electrons from the silver level may also make transitions down to holes in the valence band, provided such holes are present. Such transitions involve an emission of radiation of wave-length of about 6000 angstroms. Other levels, depending upon the doping agent used, may exist in the crystal.

The next two levels are the thermally excited hole trap level 15 and, the optically excited hole trap level 16. These two levels are characteristic of compounds made up from elements taken from group II and group VI in the periodic table, for example, cadmium sulfide and cadmium-zinc sulfide compounds in their crystalline form. These levels may yield electrons to the conduction band, in which case a hole is trapped in this level.

If a sample crystal, which is normally held at liquid nitrogen temperature, or about −150 degrees centigrade, is warmed to a temperature between carbon dioxide temperature and room temperature, electrons are excited from the thermally excited level to the conduction band, leaving holes behind in the thermally excited level. The electrons in the conduction band contribute to electrical conduction across the sample if a voltage is applied. This conduction remains even after the source of radiation is removed and the sample is cooled back to the temperature of liquid nitrogen. By mechanical tapping or illumination with infra-red energy between 9000 and 15,000 angstroms, the holes from the thermally excited level can be excited to the valence band so that the electrons in the conduction band, which have been trapped in the electron trapping level, can make the transition from that level to the valence band. These transitions involve the emission of green light and also a decrease in the conductivity of the sample. The axis along which the crystal is grown will hereafter be referred to as the C-axis and the release the energy the crystal must be tapped along this axis.

When the sample is illuminated with 6900 angstroms light, electrons are excited from the optically excited hole trapping level to the conduction band from where they can make the transition to the valence band as described previously. The electrons in the electron trapping level and the silver level can not make the transition to the valence band unless there are holes present in the valence band. Thus holes trapped at 15 and 16 provide the storage effect.

If the sample is doped with silver, electrons from the silver level also make transitions down to holes in the valence band, provided such holes are present, and such transitions involve the emission of red light of wave-length of about 6000 angstroms. Light of other colors may be obtained with other doping agents. In FIGS. 2–5, light with wave lengths shorter than 6900 angstroms such as ultraviolet light is used to stimulate the crystal and like elements in these figures are given like reference numbers. FIG. 2 has a storage crystal 20 located within a container 21 on a block of copper 22. The crystal is cooled by liquid nitrogen 23. The crystal is stimulated by irradiating it with light of a wave length of 6900 angstroms or shorter, from a source 24. After the illumination is removed, the crystal is tapped on the side 25 by a mass 26 which is suspended from a support 27. Movement of the mass can be due to acceleration or other means such as mechanical means or from the action of an electro-magnet. When the mass strikes the side 25, a green light is given off which is sensed by a sensing unit 28 which may be a photomultiplier. In an accelerometer, acceleration can be sensed by an output from sensing unit 28 due to the inertia of mass 26 causing it to strike face 25 after the crystal has been stimulated.

The mechanical tapping can also be produced by an electromechanical transducer such as a piezo-electric transducer as shown in FIG. 3. In this device an electroput from sensing unit 28 due to the inertia of mass 26 in FIG. 2. The transducer 29 must be spaced a small distance from block 20 so as to provide the mechanical tapping.

In the device of FIG. 4 use is made in the change in conductivity of the sample, when the light is given off due to the mechanical tapping, to produce an output signal. The output is taken off of electrodes 35 and 36. It is obvious that the electro-mechanical transducer of FIG. 3 could also be used with the device of FIG. 4. A few thousand flashes have been obtained with these devices and the conductivity of the sample changes after each flash so that by applying certain predetermined signals to the electro-mechanical transducer various shapes of output signals can be produced, for example, the conductivity can be made to change in a step manner by applying the signal to the transducer in the form of bursts.

In the device of FIG. 5 infra-red radiation between 9000 and 15,000 angstroms is used to release the energy. The green light given off is sensed by sensing unit 28 as in FIG. 2. Light other than green may also be obtained by use of the proper doping agents.

The devices of FIGS. 6–8 use thermal energy or very long wave length infra-red energy applied for a time sufficient to heat the crystal to simulate the storage unit. In the device of FIG. 6 a storage crystal 40 has two copper electrodes 41 and 42 located on opposite sides thereof. A pool of liquid nitrogen 43 is supplied to cool the crystal. Heat is conducted from the crystal by two heat and electrically conductive support elements 44 and 45 and conductive support straps 46 and 47. The straps 46 and 47 are very thin to permit the crystal to be heated and stimulated by the thermal energy from source 48 passing through window 49, as shown in FIG. 7. A mass 50 similar to 26 in FIG. 2 and operated in a similar manner causes the crystal to give up light energy and change its conductance. An output is taken off of leads 51 and 52. An output in the form of green or other colored light, depending upon the doping agent, could also be used with this device.

The device of FIG. 8 is similar to that of FIGS. 6 and 7 with like elements being given like reference numbers. In the device of this figure, infra-red radiation from source 60 illuminates cell 40 to release the energy and the released energy in the form of green light is sensed by sensing unit 61 to produce an output at 62. It is obvious that the change in conductance could also be used with this device to obtain an output.

In the device of FIG. 9 the change in conductive properties of the crystal are used in a storage tube.

A cathode ray tube 70 has a screen 71 made up of storage elements as shown in FIG. 10 mounted within the envelope. The storage elements are located on a heat and electrical conductive electrode 72 and is cooled by liquid nitrogen 73. This screen can be made by securing large crystals to the copper plate with a conducting bonding agent such as silver loaded plastic and then by etching or sand blasting the plate after a mask has been placed over the crystals to thereby provide individual crystal of a size depending upon the resolution desired. Certain of the cells are stimulated by an image of light with wave lengths shorter than 6900 angstroms focused upon the screen by a lens 74. The conductivity of the elements is sensed by a cathode ray beam from source 76 which is scanned across the screen by deflection means 77 and 78 and an output is taken off at 79. The image can be erased either by tapping or by irradiation with infra-red energy between 9000 and 15,000 angstroms from source 80. When the image is erased a light output signal is produced which may also be used if desired.

The device of FIG. 11 is similar to the device of FIG. 9 modified for use with thermal stimulation with like elements being given like reference numbers. In this device the electrode 72 is spaced from cooling liquid 73 and connected thereto by means of straps 95. Otherwise the device is the same as FIG. 9.

FIG. 12 shows a plurality of storage cells 99. These cells are stimulated by light from light source 100 which is modulated by a light modulating device 101 which may be a Kerr cell of electro-mechanical modulator and is scanned across the cells by a scanning device 102 which can be a mechanical scanner. The individual outputs can be taken off of common lead 103 and individual leads 104. The information on the cells can be removed by an infra-red light between 9000 to 15,000 angstroms from source 105.

Though cooling means have been shown with all of the devices, no cooling means is needed when the device is operated in space as radiation from the cell will provide the cooling.

There is thus provided a storage cell capable of storing energy for long periods of time.

While certain specific embodiments have been described in some detail, it is obvious that numerous changes may be made without departing from the general principles and scope of the invention.

We claim:

1. An energy storage unit comprising: a crystal of cadmium sulfide at the temperature of liquid nitrogen, means for illuminating said crystal with radiation with a wave length shorter than 6900 angstroms, to thereby store energy therein, means for mechanically tapping said crystal along the C-axis of said crystal to thereby release said energy and means for sensing the release of said energy.

2. An energy storage unit comprising: a crystal of cadmium sulfide, means for cooling said crystal to liquid nitrogen temperature, means for illuminating said crystal with radiation with a wave length shorter than 6900 angstroms, to thereby store energy therein, means for mechanically tapping said crystal on a side perpendicular to the C-axis of said crystal to thereby release the stored energy within said crystal in the form of green light and means responsive to said green light for producing an output signal.

3. An energy storage unit comprising: a crystal of cadmium sulfide, means for cooling said crystal to liquid nitrogen temperature, means for illuminating said crystal with radiation of a wave length shorter than 6900 angstroms, to thereby store energy therein, an electro-mechanical transducer located on a side of said crystal perpendicular to the C-axis of said crystal, means for applying a signal to said transducer to thereby release the energy within said crystal and means for sensing the release of said energy.

4. An energy storage unit comprising: a silver doped crystal of a mixture of cadmium sulfide and zinc sulfide, means for cooling said crystal to liquid nitrogen temperature, means for illuminating said crystal with ultra-violet light to thereby store energy therein, an electro-mechanical transducer located adjacent one of the sides of said crystal perpendicular to the C-axis of said crystal, means for applying a signal to said transducer to thereby release the stored energy with said crystal in the form of green light and means responsive to said green light for producing an output signal.

5. An energy storage unit comprising: a crystal consisting of a mixture of cadmium sulfide and zinc sulfide, means for cooling said crystal to liquid nitrogen temperature, means for illuminating said crystal with radiation with a wave length shorter than 6900 angstroms, to thereby store energy therein, an electro-mechanical transducer located adjacent one of the sides of said crystal perpendicular to the C-axis of said crystal, means for applying a signal to said transducer to thereby release the energy within said crystal and means for sensing the change in conductivity of said crystal when said energy is released.

6. An energy storage unit comprising: a crystal of cadmium sulfide, means for cooling said crystal to liquid nitrogen temperature, means for illuminating said crystal with radiation with a wave length shorter than 6900 angstroms, to thereby store energy therein, an electromechanical transducer located adjacent one of the sides of said crystal perpendicular to the C-axis of said crystal, means for applying a signal to said transducer to thereby release the energy within said crystal and means for sensing the change in conductivity of said crystal when said energy is released.

7. An energy storage unit comprising: a cadmium sulfide crystal having a valence band, a conduction band, a thermally excited hole trapping level and an optically excited hole trapping level, means for cooling said crystal to a temperature of about −150° centigrade, means for supplying energy to said crystal to raise electrons from one of said hole trapping levels to said conduction band to thereby store energy therein, means for mechanically tapping said crystal on a side perpendicular to the C-axis of said crystal to thereby release the energy stored therein and means for sensing the release of said energy.

References Cited in the file of this patent

UNITED STATES PATENTS

| | | |
|---|---|---|
| 2,031,884 | Gray | Feb. 25, 1936 |
| 2,234,328 | Wolff | Mar. 11, 1941 |
| 2,546,160 | Lengyel | Mar. 27, 1951 |
| 2,692,950 | Wallace | Oct. 26, 1954 |
| 2,739,243 | Sheldon | Mar. 20, 1956 |
| 2,761,070 | Moos et al. | Aug. 28, 1959 |
| 2,902,605 | Wallach | Sept. 1, 1959 |
| 2,920,205 | Choyke | Jan. 5, 1960 |
| 2,936,373 | Welker et al. | May 10, 1960 |
| 2,990,473 | Kallmann | June 27, 1961 |
| 3,031,574 | Halsted | Apr. 24, 1962 |

OTHER REFERENCES

Non-Destructive Sensing an Infrared Stimulable Phosphor, IBM Technical Disclosure Bulletin of December 1959, vol. 2, No. 4.